United States Patent [19]

Brink et al.

[11] 4,356,281

[45] Oct. 26, 1982

[54] POLYETHYLENE TEREPHTHALATE MOLDING COMPOSITION HAVING REDUCED FLAMMABILITY, AND MOLDED PRODUCTS MADE THEREFROM

[75] Inventors: Ted Brink, Arnhem; Stephanus A. G. de Graaf, Renkum, both of Netherlands

[73] Assignee: Akzo NV, Arnhem, Netherlands

[21] Appl. No.: 194,941

[22] Filed: Oct. 7, 1980

[30] Foreign Application Priority Data

Oct. 8, 1979 [NL] Netherlands ......................... 7907435

[51] Int. Cl.$^3$ .............................................. C08L 5/09
[52] U.S. Cl. ..................................... 524/397; 525/165
[58] Field of Search ....... 525/165; 260/40 R, 45.85 T; 524/546, 397

[56] References Cited

U.S. PATENT DOCUMENTS

| | | | |
|---|---|---|---|
| 3,671,487 | 6/1972 | Abolins | 525/165 |
| 3,723,373 | 3/1973 | Lucas | 525/165 |
| 4,169,827 | 10/1979 | Gerlach et al. | 260/45.85 T |
| 4,191,678 | 3/1980 | Smith | 260/40 R |
| 4,257,929 | 3/1981 | Borman | 260/40 R |

FOREIGN PATENT DOCUMENTS

| | | |
|---|---|---|
| 1694217 | 4/1971 | Fed. Rep. of Germany . |
| 2433966 | 2/1975 | Fed. Rep. of Germany . |
| 2452329 | 6/1976 | Fed. Rep. of Germany . |
| 2750811 | 5/1978 | Fed. Rep. of Germany . |
| 112074 | 11/1965 | Netherlands . |
| 208053 | 11/1965 | Netherlands . |
| 7206168 | 11/1972 | Netherlands . |
| 7603771 | 4/1976 | Netherlands . |

OTHER PUBLICATIONS

Lewin et al. –Flame–Retardant Polymeric Materials–pp. 445-446, Plenum Press (1975).

*Primary Examiner*—V. P. Hoke
*Attorney, Agent, or Firm*—Stevens, Davis, Miller & Mosher

[57] ABSTRACT

The flame retardancy of a polyethylene terephthalate ester molding composition is improved by mixing therewith both a salt of oxalic acid and polytetrafluoroethylene having a number average molecular weight $\overline{M}n$ of more than $10^5$. The oxalic acid salt has the formula $K_3[Al(C_2O_4)_3]$, $K_2[Mg(C_2O_4)_2]$ or $Rb_3[Al(C_2O_4)_3]$. The preferred composition contains from 5-15% by weight of the oxalic acid salt and 0.1-0.5% by weight of polytetrafluoroethylene. The composition having improved flame retardancy may be used to advantage for making shaped articles by injection molding.

16 Claims, No Drawings

POLYETHYLENE TEREPHTHALATE MOLDING COMPOSITION HAVING REDUCED FLAMMABILITY, AND MOLDED PRODUCTS MADE THEREFROM

This invention relates to a flame retardant polyethylene terephthalate molding composition, a method for making the composition, and to shaped products manufactured from the composition.

The molding compositions provided by the invention are suitable for shaping into differently shaped articles by injection molding, extrusion, rotation molding and other thermoplastic shaping processes.

The use of particular complex salts of oxalic acid alone for making a polyethylene terephthalate composition flame retardant is known from the Netherlands Patent Application No. 7612884. According to the application such special oxalic acid salts are advantageous over the commonly employed flame retardant substances based on halogens, phosphorus and nitrogen, the halogen compounds being the most important of these.

In addition to the composition being satisfactorily flame retardant, the volume of smoke produced upon combustion is reduced, the composition has satisfactory processability and is non toxic.

Although polyethylene terephthalate (PETP) molding compositions may be rendered fire resistant and flame retardant by adding particular complex salts of oxalic acids alone, there is a general need for these properties to be further improved without departing from the favorable mechanical properties of the articles made from the molding composition.

Particularly, there is need for PETP-based molding compositions which satisfy the most rigid standards of incombustibility. A generally accepted test method is described in Bulletin 94 of Underwriter's Laboratories (UL 94). According to this test method a material is classed UL 94-VO, which is the best rating of incombustibility, if a standard test bar extinguishes itself within an average of 5 seconds after removal of the test flame and does not drip flaming particles that ignite dry absorbent surgical cotton located below the test bar.

The same results are to be obtained in a test carried out not only with newly prepared compositions but also with artificially aged material. A more detailed description of the test method will be given hereinafter in the description.

United States Pat. No. 3,671,487 discloses glass fiber reinforced PETP molding compounds which contain a flame retardant agent and 0.9-1.9% by weight of polytetrafluoroethylene (PTFE), based on the total composition. The test method disclosed in the patent differs from the current UL 94 method, especially in that no aged material has been examined, which generally implies that the material has been less severely tested. It is often found that test bars which did meet the VO standard before aging, no longer meet the flammability requirement after aging. Moreover, according to the disclosed test method, use was made of test bars having a thickness of 3.2 mm (⅛"). The highest rating of nonburning can only be attained with thinner test bars of 1.6 mm (1/16") and 0.8 mm (1/32"), which are more difficult to be rendered incombustible.

Some molding compounds are not adapted to be injection molded into test bars having a thickness of 0.8 mm (1/32"), so the classification UL 94 VO for 1.6 mm (1/16') is the highest attainable rating.

Now it is known that the presence of a fibrous material, such as glass fibers, in a polymer molding composition containing a flame retardant agent will contribute to the effectiveness thereof in that it inhibits the dripping of a burning object. Consequently, objects made from polyester molding compounds which do not contain fibrous material such as glass fibers can seldom, if at all, be made to meet the highest requirements of the UL 94 test for thickness values of 1.6 mm (1/16") and 0.8 mm (1/32"), unless a very high proportion of flame retardant agent, usually more than 15% by weight, is incorporated in the composition. Such high proportions of flame retardant agent, however, have a very detrimental effect on the mechanical properties, especially the impact strength of the composition, so that the resulting material has little or no utility.

German Patent Application No. 2433 966 describes a series of experiments with polybutylene terephthalate (PBTP) molding compounds which contain 12-21% by weight of flame retardant agent consisting of a mixture of a halogen compound and antimony trioxide, and 0.5-1.0% by weight of polytetrafluoroethylene (PTFE), to which 0.5-1.0% by weight of non-combustile potassium titanate fibers has been added. It is stated that without the addition of these fibers the 3.2 mm (⅛") test bars will drip upon being subjected to the flammability test and the material does not qualify for the UL 94 VO rating for 3.2 mm (⅛"). Not until the fibers have been added can this material be classed UL 94 VO for 3.2 mm (⅛").

Netherlands Patent Application No. 7 603 771 describes a series of experiments with PBTP molding compounds which contain 18% by weight of a flame retardant agent consisting of a mixture of a halogen compound and 0.1-4.0% by weight of polytetrafluoroethylene (PTFE), of which the test bars are classed UL 94 VO for 1.6 mm (1/16"). To that end, however, an excessively large proportion of flame retardant agent is required. The examples also show that the incorporation into the PBTP molding compound of 30 wt.% glass fiber in the absence of PTFE but in the presence of 18 wt.% flame retardant agent will also make the material meet the UL 94 VO requirement for 1.6 mm (1/16").

An object of the present invention is to provide a PETP molding composition which contains no or very little fibrous material, and satisfies the highest requirement of flammability in accordance with the UL 94 VO test for the thicknesses: 3.2 mm, 1.6 mm and 0.8 mm (⅛", 1/16" and 1/32"), without detracting from the excellent mechanical and physical properties that are impacted to objects formed from PETP molding compositions.

Another object of the invention is to provide a PETP composition adapted to be shaped by thermoplastic shaping methods containing a flame retardant composition which has the classification of UL 94-VO determined by Underwriter's Laboratories test method for incombustibility UL 94 both before and after aging in thicknesses as thin as 1/32 inch and has mechanical and physical properties approximately equal to those properties of the same shapeable PETP composition without the flame retardant additive.

The foregoing object and others are accomplished in accordance with this invention, generally speaking, by providing a thermoplastically shapeable composition substantially free from fibrous reinforcing material and containing polyethylene terephthalate, polytetrafluoroethylene and an oxalic acid salt having the formula $K_3[Al(C_2O_4)_3]$, $K_2[Mg(C_2O_4)_2]$ and $Rb_3[Al(C_2O_4)_3]$ as a flame retardant. The preferred molding composition contains (a) 5-15% by weight of at least one of the oxalic acid salts selected from the group consisting of $K_3[Al(C_2O_4)_3]$, $K_2[Mg(C_2O_4)_2]$ and $Rb_3[Al(C_2O_4)_3]$;

(b) 0.1-0.5% by weight of polytetrafluoroethylene (PTFE) having a number average molecular weight, $\overline{M}n$, higher than $10^5$; and (c) additives usual for PETP molding compositions.

By usual additives are to be understood here substances such as pigments, mold release agents, nucleating agents and crystallization accelerating agents, thermal stabilizers, ultraviolet light stabilizers, and the like.

It has been found that the combination of a relatively small amount of PTFE and a relatively small amount of an oxalic acid salt flame retardant agent imparts excellent non-burning properties to non-reinforced PETP and has no detrimental effect on its favorable mechanical and physical properties. More particularly, it has been found that the presence of a small amount of PTFE in combination with the oxalic acid salt not only suppresses the dripping tendency, but also enhances the effect of the flame retardant agent to such a degree that the PETP molding compound containing it will attain the UL 94 VO classification for a thickness of 1.6 mm (1/16") and even for a thickness of 0.8 mm (1/32") while retaining its favorable mechanical properties, such as impact strength.

Moreover, the heat distortion temperature of articles molded from the composition of the invention is found to be at a high level. More particularly, the heat distortion temperature is higher than that of articles made from a PETP molding composition which contains an equal amount of a halogen-based fire retardant agent in combination with PTFE.

The use of a small amount of the selected complex oxalic acid salts in combination with a small amount of PTFE having a molecular weight $\overline{M}n$ of more than $10^5$ has been found to be extraordinarily effective in rendering PETP molding compositions non-burning up to the maximum attainable UL 94 classification, which effect is especially surprising in that it is far stronger than in the otherwise yet very much related PBTP molding compounds. If in PBTP the same effect is to be obtained as far as incombustibility is concerned, then the combination of the invention or the traditional compounds based on halogen together with PTFE must be used in larger amounts, resulting in a deterioration of the mechanical and the physical properties.

It is preferred that the molding composition should contain 8-12% by weight of the complex $K_3[Al(C_2O_4)_3]$. Generally, only as little as 0.15-0.3% by weight of PTFE need be incorporated in the molding compound. Such a PETP molding compound is particularly characterized by the classification UL 94 VO for a thickness of 1.6 mm (1/16") and a Charpy impact strength in accordance with ISO-R 179 of at least 30 kJ/m².

Preference is given to the use of $K_3[Al(C_3O_4)_3]$ over the other oxalic acid salts because of its strong effect and its relatively low price. The oxalate complexes may be prepared by the process disclosed in the Netherlands Patent Application No. 7 612 884.

The PTFE to be used should have a molecular weight $\overline{M}n$ of at least $10^5$. PTFE having a lower molecular weight contributes very little to enhancing the flame retardant properties of the oxalate complexes and to control of the tendency of a burning material to drip.

Any suitable PTFE may be used such as commercially available powders and dispersions in water. Examples of suitable powders are HOSTAFLON TF 1400 and HOSTAFLON TF 1740 sold by Hoechst and TEFLON no. 6 sold by Du Pont de Nemours and examples of suitable dispersions are FLUON GP 1 sold by Imperial Chemical Industry Ltd. (ICI) and HOSTAFLON TF 5032 and 5034 sold by Hoechst.

Although the invention is primarily concerned with providing non-reinforced PETP compositions that conform to the highest standards of incombustibility, the resulting favorable properties are maintained if fibrous material is incorporated into the molding composition. By fibrous materials are to be understood here fibers, such as glass fibers, metal fibers, synthetic resin fibers, carbon fibers and the like usually employed for reinforcing polymers.

Curiously enough, however, it has been found that the addition of more than 10% glass fibers has a negative influence on the fire retardant properties.

The favorable fire resistant and flame retardant properties are fully maintained, if the molding composition contains fillers which are finely divided substances in the form of particles which are not of a distinctly fibrous nature. The fillers contemplated here do not produce a higher tensile or flexural strength in the material, but they do enhance its rigidity, which is in contrast to fibrous fillers, which also enhance the tensile strength and the flexural strength. As examples of suitable fillers may be mentioned glass spheres, talc, kaolin, wollastonite, chalk, mica, powdered metal and the like, preferably in an amount of 1-40% by weight, based on the weight of the molding composition. It should be added that although the mineral wollastonite particles have a somewhat elongated shape, they do not have the above-mentioned distinctly fibrous nature which is characteristic of, for instance, reinforcing fiber such as glass fiber.

The effect of the combination of the selected oxalic acid salts and the PTFE in PETP has been found to decrease with increasing fiber content in the molding composition. With the molding composition containing 30% or more glass fibers the effect has been found to decrease considerably. Nor is there any question of extraordinary effectiveness in PBTP molding compositions, irrespective of whether or not they contain glass fibers in a reinforcing amount, which effect however does happen to be found with PETP molding compounds containing no or very little fibrous material and must therefore be regarded as unpredictably favorable.

The flame retardant effect of the oxalate complexes is at least partly due to the splitting off of $CO_2$, as a result of which the supply of $O_2$ is screened off. The formation of the protective gas is clearly apparent from the high degree of foaming on the surface of a burning object of PETP containing these flame retardants. Seemingly, the fire resistance may be promoted and the dripping of burning material resisted by incorporating into the molding compound a means which leads to a chemical bond between the polyethylene terephthalate molecules or the residues thereof when the material is burning. A suitable substance to this end is, for instance, $Ca(OH)_2$, of which it is known that when used in combination with halogen-containing organic flame retardant agents it suppresses substantially the dripping tendency of the formed objects as a result of the increase in effective molecular weight by the coupling of the polymer chains. According to German Patent Application No. 2 524195, the use of 2% by weight of Ca(OH)$_2$ suffices for a PBTB molding compound containing a mixture of 9% by weight of deca-bromodiphenyl ether and 4% by weight of antimony oxide as flame retardant agent to be rendered non-dripping and be classed UL 94-SE-O, no mention being made however of the thickness of the test bars. In the UL 94-SE test no aged material is examined. The results are therefore generally somewhat more favorable than those obtained with the otherwise similar UL 94-VO test.

It has now been found, however, that the use in PETP molding compounds of Ca(OH)$_2$ in combination with the oxalates as flame retardant agents does not produce any effect in controlling the dripping of a burning material.

It is therefore surprising that PTFE, especially when it has a molecular weight $\overline{M}n$ of higher than $10^5$, is capable of enhancing the effect of the complex salts of oxalic acid of the invention, especially considering that PTFE is extraordinarily inert and will not form or cause the formation of a chemical bond between the PETP molecules or residues thereof.

It is also known that not only fibers, such as glass fibers, and Ca(OH)$_2$, but also other substances, for instance colloidal SiO$_2$, sodium acetate and calcium chloride contribute to the effect of flame retardant agents in thermoplastic polymers. It has been found, however, that PTFE having a molecular weight $\overline{M}n$ higher than $10^5$ has an unexpected and extraordinarily strong effect on the action of the oxalate complex in PETP molding compositions, whereas colloidal SiO$_2$Ca(OH)$_2$, CaCl$_2$ and sodium acetate are hardly effective as such in combination with the disclosed oxalates in PETP. PTFE having a molecular weight $\overline{M}n$ lower than $10^5$ is substantially ineffective. It has further been found that PTFE in the form of very small particles, for instance of 0.1–50 μm, is just as effective as when it is used in the form of coarser particles, for instance of 300–500 μm, provided that the molecular weight $\overline{M}n$ is higher than $10^5$.

Methods for the preparation of the PETP are disclosed in available technical literature. The molecular weight of PETP suitable to be processed into molded objects should not be too low, because in that case the material would have a poor impact strength. It is common practice to choose a relative viscosity higher than 1.75. The relative viscosity is expressed as that of a 1%-solution of the PETP in meta cresol at 25° C.

The PETP may contain relatively small amounts, but preferably not more than 5% by weight, of other thermoplastic polymers, such as polyethylene, polypropylene, polyamide, polybutylene terephthalate, and copolymers built up from ethylene terephthalate together with an ester of terephthalic acid and another diol, such as 1,3-propanediol or 1,4-butanediol.

The molding compounds according to the invention may be prepared by conventional mixing methods that are commonly employed for incorporating additives into thermoplastics. Thus, the oxalate, the PTFE, other additives, if any, and the PETP granulate may or may not be precompounded before being fed to an extruder. After the additives have been mixed with the molten polymer, the resulting blend is extruded, cooled and processed into granulate again. Alternatively, the PETP granulate may be coated with the oxalate and PTFE in the form of a powder or a dispersion and subsequently be processsed or again formed into a granulate. Moreover, it is also possible for the oxalate to be fed to the polycondensation mixture in the form of a dispersion in ethylene glycol prior to the polycondensation process.

Fillers such as talc and wollastonite may be metered into the feed port of the extruder in a usual manner at a uniform rate so that they are incorporated into the molding compound uniformly while properly mixed.

The material may be tested for flammability in accordance with the following procedure. In conformity with the UL 94 (1979) test method of Underwriter's Laboratories the material is injection molded into test bars measuring 127×12.7×1.6 mm (1/16") and 127×12.7×0.8 mm (1/32"). In each test the average value is determined of the results of 5 bars conditioned for 48 hours at 23°±2° C. and 50% R.H. and that of 5 bars artificially aged by exposure for 7 days to air of 70° C.

Each bar is vertically suspended and a flame is kept against its lower end for 10 seconds. This procedure is repeated when the flaming of the test bar ceases.

For a material to be classed UL 94-VO and VI, respectively, it shall comply with the following requirements:

(a) none of the 10 test bars shall burn for more than 10 seconds (30 seconds) after the first and the second removal of the flame;

(b) the total flaming combustion shall not exceed 50 seconds (250 seconds) for the 10 flame applications for each set of 5 test bars;

(c) none of the test bars shall drip flaming particles that ignite absorbent surgical cotton located 300 mm below the test bar;

(d) none of the test bars shall display glowing combustion which persists beyond 30 seconds (60 seconds) after the second removal of the test flame. (All bracketed values for V l)

The LOI (Limiting Oxygen Index) of the molding compounds may be measured by the procedure of ASTM-D 2863 with the aid of a tester made by Stanton Redcroft, Great Britain. The LOI value is defined as the oxygen concentration expressed as a percentage of a mixture of oxygen and nitrogen that will just support combustion of a vertically clamped test specimen whose top is contacted with a flame.

The viscosity of the polyester of the molding compound is determined in accordance with the following procedure.

The relative viscosity of the PETP of the molding compound is measured with a solution of 1 g PETP in 100 ml of a mixture of trichlorophenol and phenol, weight ratio 72:100, at 25°±0.05° C. with the aid of a Ubbelohde capillary viscometer. The value found is converted into the value which would have been found in m-cresol, use being made of the following formula:

$$\eta rel.\text{m-cresol} = 0.795\ \eta rel.\text{tcp}/p + 0.219$$

The relative viscosity of a PBTP molding compound is measured in a similar way in a solution of 1 g PBTP in 100 ml m-cresol at 25°±0.05° C.

The determination of the molecular weight $\overline{M}n$ of the PTFE is carried out in accordance with the method described by Suwa, Takehisa and Machi in J. Appl. Pol. Sci. 17 (1973; pp. 3253–3257.

This method is based on the relationship between the molecular weight $\overline{M}n$ and heat of crystallization, the latter being measured by differential thermal analysis.

This relationship is as follows:

$$\overline{M}n = 2.1 \times 10^{10} \Delta H_c^{-5.16}$$

$\Delta H_c$ in cal/g

The invention will be further described in the following examples.

EXAMPLE 1

In this example the flame retardant properties of a PETP molding composition containing a complex salt of oxalic acid both without and in combination with PTFE are compared with the flame retardant properties of a PETP molding composition containing an equal amount of a commonly employed halogen-containing flame retardant without and in combination with a corresponding amount of PTFE. As halogen-containing flame retardant there is used a mixture of 50% be weight of decabromodiphenyl ether (DBDE) and 50% by weight of antimony oxide, which mixture is known to be a particularly effective flame retardant for theremoplastic polyesters.

The following materials are processed:

Granulate of PETP having a relative viscosity of 1.98.

Powdered potassium-aluminium oxalate, $K_3[Al(C_2O_4)_3]$, (K.Al.ox) prepared as described in Netherlands Patent Application 7612884.

Decabromodiphenyl ether, $C_{12}Br_{10}O$ (DBDE).

Antimony trioxide, $Sb_2O_3$.

Polytetrafluoroethylene, type Hostaflon TF 1740 of Hoechst AG, molecular weight Mn about $3.2 \times 10^6$, average particle size 40 μm (PTFE).

In a rotary mixer the PTFE powder is distributed over the surface of the PETP granulate. This granulate and the K.Al.ox are fed at a uniform rate to a twin screw extruder of the Werner-Pfleiderer type, ZDSK 53.

The cylinder temperature is set at 265°–270° C.

The melt is extruded and re-processed into granulate. Subsequently, the usual amounts of mold release agent and crystallization accelerator are added.

This granulate is injection molded into test bars having a thickness of 0.8 mm (UL 1/32") or 1.6 mm (UL 1/16") in a Stubbe injection molding machine of the SKM 51 type.

The PETP molding compound containing DBDE and the test bars thereof are made in the same manner.

The results of the UL 94 and ASTM D2863 test procedures are summarized in Table 1.

TABLE 1

| | Flammability of PETP molding composition measured on 0.8 mm test bars containing: | | | | | | | |
|---|---|---|---|---|---|---|---|---|
| | 10% K.Al. ox. | | 20% K.Al. ox. | | 10% DBDE/ $Sb_2O_3$ | | 20% DBDE/ $Sb_2O_3$ | |
| | | 0.25% PTFE | | 0.25% PTFE | | 0.25% PTFE | | 0.25% PTFE |
| 5 UL94 test bars 0.8 mm conditioned In all, 10 flame applications | | | | * | | | | |
| Combustion time sec. | 14 | 19 | 12 | 8 | 3 | 43 | 0 | 0 |
| number of drips on surgical cotton | 24 | 2 | 29 | 0 | 28 | 14 | 23 | 0 |
| number of ignitions | 9 | 0 | 8 | 0 | 1 | 3 | 0 | 0 |
| 5 UL94 test bars 0.8 mm aged In all, 10 flame applications | | | | | | | | |
| Combustion time sec. | 10 | 7 | 10 | 4 | 11 | 17 | 0 | 0 |
| Number of drips on surgical cotton | 33 | 0 | 36 | 0 | 31 | 3 | 27 | 0 |
| number of ignitions | 5 | 0 | 3 | 0 | 1 | 2 | 0 | 0 |
| UL-classification for 0.8 mm (1/32") | | VO | | VO | | | VO | VO |
| LOI-value | 30.4 | 30.4 | 33.9 | 32.6 | 29.4 | 28.5 | 36.6 | 37.4 |

*test bars 1.6 mm (1/16")

The above results show that a PETP molding composition containing as little as 10% by weight of the complex potassium-aluminum oxalate and 0.25% by weight of PTFE of $\overline{M}n$ $3.2 \times 10^6$ already meets the highest UL flame retardance requirement for the thinnest test bars, which is in contrast with a PETP molding composition into which for the oxalate an equally high amount of the known effective flame retardant combination DBDE and $Sb_2O_3$ is incorporated.

It particularly appears that the PTFE moreover enhances the flame retardant effect of the oxalate after aging of the molding. But PTFE reduces the flame retardant effect of the DBDE-$Sb_2O_3$-combination in PETP molding compounds.

EXAMPLE 2

In this example the effect of PTFE as anti-dripping agent in a PETP molding composition and the complex potassium-aluminum oxalate as flame retardant is compared with the effect of other anti-dripping agents known to be used for polyester.

In the manner described in Example 1 a granulate is prepared from PETP molding composition containing 10% by weight $K_3Al(C_2O_4)_3$. Uniform distribution over the surface of the granulate leads to the incorporation therein respectively of:

1.0 wt% sodium acetate (NaOOCCH$_3$)
0.5 wt% calcium hydroxide (Ca(OH)$_2$)
1.0 wt% calcium chloride (CaCl$_2$)
1.0 wt% colloidal silica oxide (SiO$_2$)

The SiO$_2$ is added together with the oxalate.

The granulate thus treated is formed into test bars in the manner described in Example 1. The molding composition containing PTFE is prepared in accordance with Example 1.

The test in accordance with the UL 94 procedure leads to the results summarized in Table 2.

In a rotary mixer the PETP granulate is subjected to polycondensation under vacuum and at a granulate temperature of 220° C. to the viscosity stated in Table 3.

The test bars are obtained in the manner described in Example 1.

The PBTP starting polymer has a relative viscosity of 2.10.

TABLE 2

Effect of anti-dripping agents on PETP molding composition containing 10% K.Al.ox. UL 94 test bars 1.6mm (1/16").

|  | 0% | 1.0% NaOOCCH$_3$ | 0.5% Ca(OH)$_2$ | 1.0% CaCl$_2$ | 1.0% SiO$_2$ | 0.25% PTFE |
|---|---|---|---|---|---|---|
| 5 test bars conditioned In all, 10 flame applications |  |  |  |  |  | * |
| Combustion time sec | 18 | 14 | 18 | 28 | 15 | 10 |
| Number of drips on surgical cotton | 10 | 19 | 44 | 35 | 4 | 0 |
| Number of ignitions | 2 | 4 | 2 | 9 | 1 | 0 |
| 5 test bars aged In all, 10 flame applications |  |  |  |  |  |  |
| Combustion time sec | 12 | 10 | 17 | 15 | 17 | 2 |
| Number of drips on surgical cotton | 29 | 32 | 33 | 40 | 22 | 0 |
| Number of ignitions | 4 | 5 | 1 | 9 | 4 | 0 |
| UL94-classification | — | — | — | — | — | VO |

*test bars 0.8 mm (1/32")

The above results show that the effect of the combination of 10% potassium-aluminum oxalate and 0.25% PTFE as fire retardant agent in PETP is far stronger than that of the combination of 10% potassium-aluminum oxalate with other agents known in themselves. Moreover, in contrast with other agents PTFE is found to improve substantially the flame retardant effect of the oxalate.

EXAMPLE 3

In this example a comparison is made between the most important mechanical properties of non-filled PETP molding compounds which contain as flame retardant agent the oxalate combined with PTFE and those of PETP and PBTP molding compounds which contain as flame retardant agent the mixture of deca bromodiphenyl ether-antimony oxide (weight ratio 1:1) and PTFE.

The results are listed in Table 3.

TABLE 3

| | | | | Mechanical Properties | | | | |
|---|---|---|---|---|---|---|---|---|
| | | | ISO-R527 | ISO-R178 | | | ISO-R179 | |
| | | | | | | | Charpy | Charpy Notch |
| | % PTFE | $\eta$ rel. | tensile strength MN/m$^2$ | flexural strength MN/m$^2$ | flexural modulus MN/m$^2$ | | impact strength KJ/m$^2$ | impact strength KJ/m$^2$ |
| PETP molding compositions | | | | | | | | |
| K.Al.ox. % 0 | | 1.93 | 42 | 110 | 3000 | | no break | 3.0 |
| 5 | | 1.75 | 70 | 87 | 3206 | | 42.4 | 5.2 |
| 10 | | 1.84 | 67 | 88 | 3203 | | 30.9 | 5.2 |
| 15 | | 1.79 | 61 | 91 | 3323 | | 20.1 | 3.9 |
| 5 | 0.25 | 1.75 | 59 | 84 | 3064 | | 79.0 | 5.7 |
| 10 | 0.25 | 1.84 | 64 | 89 | 3272 | | 38.3 | 4.8 |
| DBDE/Sb$_2$O$_3$ % 10 | 0.25 | 1.86 | 59 | 88 | 3082 | | 37.2 | 2.7 |
| PBTP molding compositions | | | | | | | | |
| DBDE/Sb$_2$O$_3$ % 10 | | 1.99 | 59 | 75.7 | 2615 | | no break | 3.1 |
| 20 | | 1.96 | 59 | 80.6 | 2814 | | no break | 2.9 |
| 10 | 0.25 | 1.99 | 57 | 75.1 | 2592 | | 31.6 | 3.0 |
| 20 | 0.25 | 1.96 | 57 | 80.8 | 2808 | | 21.7 | 3.1 |

The above results show that a non-filled PETP molding composition containing as little as 10% by weight of potassium-aluminum oxalate and 0.25% by weight of PTFE not only has excellent fire retardant properties, as is shown in Table 1, but also very favorable mechanical properties.

EXAMPLE 4

This example is concerned with the influence of such fillers as talc, wollastonite and glass fiber on the fire retardant properties of a PETP molding composition containing as fire retardant agent the complex potassium-aluminum oxalate and PTFE.

The fillers are metered into the feed port of the extruder. For the preparation, the same conditions apply as stated in Example 1, except that the PETP starting material has a relative viscosity of 1.65.

The test results are listed in Table 4.

TABLE 4

Influence of fillers on flame retardant properties of PETP molding compositions

|  | 30% glass fibres 8% K.Al.ox. 0.25% PTFE | 25% talc 8.6% K.Al.ox. 0.25% PTFE | 30% wollastonite 10% K.Al.ox. 0.25% PTFE |
|---|---|---|---|
| $\eta$rel | 1.76 | 1.65 | 1.68 |
| 5 UL94 test bars 1.6 mm (1/16") conditioned |  |  |  |
| In all, 10 flame applications |  |  |  |
| Combustion time sec. | in excess of 250 | 15 | 12 |
| Number of drips on surgical cotton | 2 | 0 | 0 |
| Number of ignitions | 2 | 0 | 0 |
| 5 UL94 test bars 1.6 mm (1/16") aged |  |  |  |
| In all, 10 flame applications |  |  |  |
| Combustion time sec. | in excess of 250 | 13 | 7 |
| Number of drips on surgical cotton | 5 | 0 | 0 |
| Number of ignitions | 5 | 0 | 0 |
| UL94 classification for 1.6 mm (1/16") | — | VO | VO |

This example shows that as little as 8–10% by weight of potassium-aluminum oxalate combined with 0.25% by weight of PTFE suffices for PETP molding compounds containing 25–30% by weight of non-fibrous fillers to meet the UL 94-VO requirements for 1.6 mm (1/16"). This classification is not attained if the filler is a glass fiber.

EXAMPLE 5

In this example the effect of the molecular weight $\overline{M}n$ of the PTFE on the fire retardance of a PETP molding composition is demonstrated. The molding compositions are prepared by the process of Example 1.

The results are summarized in Table 5.
The following PTFE types are tested:
(A) "Polymist" F5A, manufactured by Allied Chemicals.
  powdered, $\overline{M}n$ about $2.3 \times 10^4$.
(B) "Fluon" GP1, manufactured by ICI.
  dispersion in water, $\overline{M}n$ about $8.5 \times 10^6$, particle size 0.2–0.5 μm.
(C) "Hostaflon" TF 1740, manufactured by Hoechst.
  powdered, $\overline{M}n$ about $3.2 \times 10^6$, particle size 40 μm.

TABLE 5

Fire retardant behavior of PETP molding composition containing 10 wt % K.Al.ox. and 0.25 wt % PTFE.
UL 94 test bars 1,6 mm (1/16")

|  | no PTFE | A | B | C |
|---|---|---|---|---|
| 5 test bars, conditioned |  |  |  |  |
| In all, 10 flame applications |  |  |  |  |
| Combustion time sec. | 18 | 16 | 10 | 10 |
| Number of drips on surgical cotton | 10 | 8 | 0 | 0 |
| Number of ignitions | 2 | 1 | 0 | 0 |
| 5 test bars, aged |  |  |  |  |

TABLE 5-continued

Fire retardant behavior of PETP molding composition containing 10 wt % K.Al.ox. and 0.25 wt % PTFE.
UL 94 test bars 1,6 mm (1/16")

|  | no PTFE | A | B | C |
|---|---|---|---|---|
| In all, 10 flame applications |  |  |  |  |
| Combustion time sec. | 12 | 11 | 2 | 2 |
| Number of drips on surgical cotton | 29 | 25 | 0 | 0 |
| Number of ignitions | 4 | 3 | 0 | 0 |
| UL-94 classification | — | — | VO | VO |

The above results show that the afore-mentioned influence on fire retardant properties is only found with PTFE types having a molecular weight ($\overline{M}n$) higher than $10^5$.

Although the invention has been described in detail for the purpose of illustrating the invention, it is to be understood that such detail is solely for that purpose and those skilled in the art can make variations therein without departing from the spirit and scope of the invention except as it is limited by the claims.

It is claimed:

1. A flame retardant polyethylene terephthalate molding composition which contains as flame retardant additive a complex salt of oxalic acid, characterized in that, based on the weight of the total composition, the molding composition contains:
  (a) 5–15% by weight of at least one of the oxalic acid salts selected from the group consisting of $K_3[Al(C_2O_4)_3]$, $K_2[Mg(C_2O_4)_2]$ and $Rb_3[Al(C_2O_4)_3]$; and
  (b) 0.1–0.5% by weight of polytetrafluoroethylene having a number average molecular weight, $\overline{M}n$, higher than $10^5$.

2. The molding composition of claim 1, characterized in that the said composition contains 8–12% by weight of the complex $K_3[Al(C_2O_4)_3]$.

3. The molding composition of claim 1 or 2, characterized in that the said composition contains 0.15–0.3% by weight of polytetrafluoroethylene.

4. The molding composition of claim 1 or 2 characterized in that it meets the UL 94-VO flammability standards for 1.6 mm thick test bars and has an impact strength higher than 30 kJ/m$^2$.

5. The molding composition of claim 1 or 2 containing 1–40% by weight of solid non-fibrous filler.

6. A molded article made from the molding composition of claim 1 or 2.

7. The molding composition of claim 3 having a UL 94-VO flammability standard for 1.6 mm. which meets the requirements of US 94-VO and an impact strength of more than 30 kJ/m$^2$.

8. A method for preparing a polyethylene terephthalate ester composition adapted to be molded into non-fibrous reinforced articles as thin as 1/32 inch which meet the requirements of UL 94-VO incombustibility test after aging which comprises mixing substantially uniformly in the composition a fire retarding amount of polytetrafluoroethylene having a number average molecular weight of more than $10^5$ and an oxalic acid salt having the formula $K_3[Al(C_2O_4)_3]$, $K_2[Mg(C_2O_4)_2]$ or $Rb_3[Al(C_2O_4)_3]$.

9. The method of claim 8 wherein 5–15% of the oxalic acid salt and 0.1 to 0.5% by weight of said polytetrafluoroethylene are mixed with the said polyethylene terephthalate composition.

10. A polyethylene terephthalate molding composition meeting UL 94-VO incombustibility rating in thicknesses as thin as 1/32 inch when said composition is substantially free from fibrous reinforcing material and containing a fire retardant comprising an oxalic acid salt having the formula $K_3[Al(C_2O_4)_3]$, $K_2[Mg(C_2O_4)_2]$ or $Rb_3[Al(C_2O_4)_3]$ and polytetrafluoroethylene having a number average molecular weight of $\overline{M}n$ above $10^5$.

11. The molding composition of claim 10 containing 5-15% by weight of at least one of the said oxalic acid salts and 0.1-0.5% by weight of said polytetrafluoroethylene.

12. An article of manufacture shaped by injection molding a flame retardant polyethylene terephthalate composition containing an oxalic acid salt having the formula $K_3[Al(C_2O_4)_3]$, $K_2[Mg(C_2O_4)_2]$ or $Rb_3[Al(C_2O_4)_3]$ and polytetrafluoroethylene having a number average molecular weight of more than $10^5$ which article has an incombustibility rating within the requirements of UL 94-VO in a thickness of 1/32 inch.

13. A method of improving the incombustibility rating of a polyethylene terephthalate ester adapted to be shaped in a die which comprises mixing substantially uniformly therewith a salt of oxalic acid having a formula of claim 1 and polytetrafluoroethylene having a molecular weight of at least $10^5$ in amounts whereby test bars of the said ester which are free of fibrous reinforcing material and have a thickness of as thin as 1/32 inch meet the requirements of UL 94-VO test method.

14. A shaped polyethylene terephthalate ester article having an improved combustibility rating comprising an oxalic acid salt of the formula of claim 1 and polytetrafluoroethylene having a molecular weight of more than $10^5$ in amounts whereby test bars of the ester without fibrous reinforcement have a combustibility within the requirements of UL 94-VO test method in thicknesses as thin as 1/32 inch.

15. In a method for improving the flame retarding properties of a molded polyethylene terephthalate article which comprises including in the polyethylene terephthalate a complex salt of oxalic acid, the further improvement which provides a polyethylene terephthalate article substantially free from fibrous reinforcement which rates UL 94-VO when tested in accordance with Underwriter's Laboratories Test Method 94 and has mechanical properties substantially equal to the mechanical properties of a similar article molded from polyethylene terephthalate having the same chemical composition, but substantially free from said complex salt of oxalic acid, said improvement comprising mixing substantially uniformly with the polyethylene terephthalate composition effective amounts of both polytetrafluoroethylene having an average number molecular weight of at least $10^5$ and an oxalic acid salt having the formula $K_3[Mg(C_2O_4)_2]$ or $Rb_3[Al(C_2O_4)_3]$.

16. The method of claim 12 wherein an article having a thickness of 0.8 mm. is produced which has improved dripping characteristics when burned.

* * * * *